(12) United States Patent
Ragupathy

(10) Patent No.: US 10,996,763 B2
(45) Date of Patent: May 4, 2021

(54) SYSTEM FOR AND METHOD OF MANAGING GESTURES IN VIRTUAL REALITY

(71) Applicant: JPMorgan Chase Bank, N.A., New York, NY (US)

(72) Inventor: Viswapriyan Ragupathy, Lewis Center, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 49 days.

(21) Appl. No.: 16/173,205

(22) Filed: Oct. 29, 2018

(65) Prior Publication Data
US 2019/0138105 A1    May 9, 2019

Related U.S. Application Data

(60) Provisional application No. 62/583,115, filed on Nov. 8, 2017.

(51) Int. Cl.
| G06F 3/01 | (2006.01) |
|---|---|
| G06K 9/00 | (2006.01) |
| G06F 16/29 | (2019.01) |
| G06K 9/62 | (2006.01) |

(52) U.S. Cl.
CPC .............. *G06F 3/017* (2013.01); *G06F 3/011* (2013.01); *G06F 16/29* (2019.01); *G06K 9/00342* (2013.01); *G06K 9/00355* (2013.01); *G06K 9/6215* (2013.01)

(58) Field of Classification Search
CPC .......... G06F 3/017; G06F 3/011; G06F 16/29; G06K 9/00342; G06K 9/00355; G06K 9/6215
USPC ........................................................ 345/156
See application file for complete search history.

(56) References Cited

U.S. PATENT DOCUMENTS

| 2011/0035666 | A1* | 2/2011 | Geisner | G06F 3/011 |
|---|---|---|---|---|
| | | | | 715/709 |
| 2011/0173204 | A1* | 7/2011 | Murillo | A63F 13/428 |
| | | | | 707/741 |
| 2012/0287044 | A1* | 11/2012 | Bell | G06K 9/00335 |
| | | | | 345/158 |
| 2018/0018588 | A1* | 1/2018 | Dalton | G06Q 10/067 |

\* cited by examiner

*Primary Examiner* — Mark Edwards
(74) *Attorney, Agent, or Firm* — Greenblum & Bernstein, P.L.C.

(57) ABSTRACT

Systems for and methods of managing input gestures of a user within a simulated environment are provided.

20 Claims, 7 Drawing Sheets

SYSTEM FOR AND METHOD OF MANAGING GESTURES IN VIRTUAL REALITY

CROSS REFERENCE TO RELATED APPLICATIONS

This application claims priority to and any benefit of U.S. Provisional Patent Application No. 62/583,115, filed Nov. 8, 2017, the content of which is incorporated herein by reference in its entirety.

FIELD

The general inventive concepts relate to virtual reality and, more particularly, to systems for and methods of managing input gestures within a virtual reality environment.

BACKGROUND

Virtual reality (VR) is a computer technology that simulates a user's presence in a computer-generated environment. The virtual environment can represent a real-world environment or an entirely imaginary environment. The sense of immersion within the virtual environment is typically achieved by providing imagery of the environment to screens located directly in front of the user's eyes, such as by mounting the screens in a headset to be worn by the user. In some cases, other sensory input (e.g., sound) can be provided to the user to further increase the sense of immersion.

There are many known techniques in which a user can interact with a VR environment. For example, a controller can be held in or worn on a hand of the user. The VR system detects the positioning of the controller such that the user can manipulate the controller in the VR environment to achieve a desired outcome. The controller may also include buttons, switches, triggers, or other means of providing input to the VR system. In some instances, the VR system alters the appearance of the controller so that it either does not appear to the user within the environment or so that is appears as another object (e.g., a wrench, a lightsaber) appropriate to the environment. Another form of user input in a VR environment is voice commands. Yet another form of user input in a VR environment is hand gestures. A hand gesture is a specific positioning and/or movement of the hand and its fingers that the VR system attributes to a command. In some cases, the hand gesture may incorporate some or all of the arm as well.

The use of hand gestures as a form of input in a VR system has drawbacks however. For example, commonly understood meanings associated with a particular hand gesture may vary based on the culture, region, country, etc. of the user, notwithstanding that the intended VR application input is the same. As another example, there may be slight variations in gesturing from user to user for the same intended VR application input.

Accordingly, there is an unmet need for systems for and methods of managing input gestures within a virtual reality environment that overcome or otherwise mitigate these drawbacks.

SUMMARY

The general inventive concepts relate to and contemplate systems for and methods of managing input gestures within a simulated (e.g., virtual reality) environment.

In one exemplary embodiment, a system for managing input gestures in a simulated environment is provided. The system comprises: a first processor for generating the simulated environment, means for capturing movements by a user interacting with the simulated environment, and a second processor for interpreting the movements by the user to identify a first input gesture. In some exemplary embodiments, the first processor and the second processor could be the same processor. As used herein, "processor" refers to logic for implementing the system or a portion thereof. Such logic can include software and/or hardware the performs the necessary functions. In some exemplary embodiments, the logic could be embodied in a general-purpose computer or other processor-containing device (smart phone, tablet, etc.). In some exemplary embodiments, the second processor is logic that interfaces with an existing system for generating a simulated environment (e.g., a commercially available virtual reality system). In such embodiments, the existing system for generating the simulated environment could also encompass the means for capturing movements by the user interacting with the simulated environment.

In the system, the second processor determines whether the first input gesture corresponds to a second input gesture selected from a first plurality of predefined input gestures usable within the simulated environment, wherein the first plurality of predefined input gestures usable within the simulated environment differs from a second plurality of predefined input gestures usable within the simulated environment. Thus, the system can provide multiple different sets of predefined input gestures usable within the simulated environment.

In some exemplary embodiments, the first plurality of predefined input gestures is associated with a first geographic region, and the second plurality of predefined input gestures is associated with a second geographic region. In some exemplary embodiments, the first geographic region is a first country, and the second geographic region is a second country.

In some exemplary embodiments, the second processor automatically applies the first plurality of predefined input gestures if the user is in the first country and the second plurality of predefined input gestures if the user is in the second country.

In some exemplary embodiments, at least one of the first plurality of predefined input gestures and the second plurality of predefined input gestures is selected based on a trait of the user, such as gender, age, native-language, etc.

In some exemplary embodiments, at least one of the first plurality of predefined input gestures and the second plurality of predefined input gestures includes one or more input gestures defined by the user.

In some exemplary embodiments, the second input gesture represents an intended action within the simulated environment, wherein a third input gesture selected from the second plurality of predefined input gestures usable within the simulated environment represents the intended action, and wherein the second input gesture and the third input gesture are different.

In some exemplary embodiments, the second input gesture is associated with movement of a body part of the user, and the third input gesture is not associated with movement of the body part of the user.

In some exemplary embodiments, the body part is selected from the group consisting of a left hand, a right hand, a left arm, a right arm, a left foot, a right foot, a left leg, a right leg, a left eye, a right eye, and a head of the user.

In some exemplary embodiments, the means for capturing movements by the user comprises at least one camera. In some exemplary embodiments, the means for capturing movements by the user comprises at least one sensor that moves with a body part of the user.

In some exemplary embodiments, the first plurality of predefined input gestures is stored in a first data store. In some exemplary embodiments, the second plurality of predefined input gestures is stored in a second data store. In some exemplary embodiments, the first data store and the second data store are the same.

In some exemplary embodiments, the simulated environment is a virtual reality environment. In some exemplary embodiments, the simulated environment is an augmented reality environment.

In one exemplary embodiment, a system for managing input gestures in a simulated environment is provided. The system comprises: a first processor for generating the simulated environment, means for capturing movements by a user interacting with the simulated environment, and a second processor for interpreting the movements by the user to identify a first input gesture representing an intended action within the simulated environment. In some exemplary embodiments, the first processor and the second processor could be the same processor. As noted above, "processor" refers to logic for implementing the system or a portion thereof. Such logic can include software and/or hardware the performs the necessary functions. In some exemplary embodiments, the logic could be embodied in a general-purpose computer or other processor-containing device (smart phone, tablet, etc.). In some exemplary embodiments, the second processor is logic that interfaces with an existing system for generating a simulated environment (e.g., a commercially available virtual reality system). In such embodiments, the existing system for generating the simulated environment could also encompass the means for capturing movements by the user interacting with the simulated environment.

In the system, the second processor identifies a second input gesture representing the intended action selected from a plurality of predefined input gestures usable within the simulated environment. If the second processor determines that the first input gesture it outside a threshold of tolerance for the second input gesture, the second processor causes the first input gesture to be added to the plurality of predefined input gestures as an alternative input gesture for the intended action.

In some exemplary embodiments, the plurality of predefined input gestures includes a first alternative input gesture associated with a first user for the intended action and a second alternative input gesture associated with a second user for the intended action.

In some exemplary embodiments, the second processor automatically applies the first alternative input gesture if the first user is using the system and the second alternative input gesture if the second user is using the system.

In some exemplary embodiments, the means for capturing movements by the user comprises at least one camera. In some exemplary embodiments, the means for capturing movements by the user comprises at least one sensor that moves with a body part of the user.

In some exemplary embodiments, the simulated environment is a virtual reality environment. In some exemplary embodiments, the simulated environment is an augmented reality environment.

In one exemplary embodiment, a method of managing input gestures in a simulated environment is provided. The method comprises: generating the simulated environment; providing a collection of first input gestures usable within the simulated environment; capturing movements by a user interacting with the simulated environment; processing the movements to identify a second input gesture; and determining if the collection of first input gestures includes any third input gestures specific to the user. If the collection of first input gestures includes at least one third input gesture, for each third input gesture: (1) calculating a variance between the second input gesture and the third input gesture, (2) determining if the variance is within a predefined threshold associated with the third input gesture; (3) using the third input gesture if the variance is within the threshold, and (4) rejecting the third input gesture if the variance is not within the threshold. Alternatively, if the collection of first input gestures does not include at least one third input gesture, for each first input gesture in the collection: (1) calculating a variance between the second input gesture and the first input gesture, (2) determining if the variance is within a predefined threshold associated with the first input gesture; (3) using the first input gesture if the variance is within the threshold, and (4) rejecting the first input gesture if the variance is not within the threshold.

In some exemplary embodiments, the collection of first input gestures includes at least one input gesture selected based on a current location of the user.

In some exemplary embodiments, capturing movements by a user interacting with the simulated environment comprises tracking a position of one or more sensors associated with at least one body part of the user. In some exemplary embodiments, at least one of the sensors is a handheld sensor.

In some exemplary embodiments, the collection of first input gestures is stored in a data store.

In some exemplary embodiments, the simulated environment is a virtual reality environment. In some exemplary embodiments, the simulated environment is an augmented reality environment.

In one exemplary embodiment, a method of managing input gestures in a simulated environment is provided. The method comprises: generating the simulated environment; providing a collection of first input gestures usable within the simulated environment; capturing movements by a user interacting with the simulated environment; processing the movements to identify a second input gesture representing an intended action within the simulated environment, and determining if the collection of first input gestures includes a third input gesture corresponding to the intended action specific to the user. If the collection of first input gestures includes the third input gesture: (1) calculating a variance between the second input gesture and the third input gesture, (2) determining if the variance is within a predefined threshold associated with the third input gesture; (3) using the third input gesture if the variance is within the threshold, and (4) allowing the user to accept the second input gesture as a new third input gesture for the intended action if the variance is not within the threshold. Alternatively, if the collection of first input gestures does not include the third input gesture, for the first input gesture corresponding to the intended action in the collection: (1) calculating a variance between the second input gesture and the first input gesture, (2) determining if the variance is within a predefined threshold associated with the first input gesture; (3) using the first input gesture if the variance is within the threshold, and (4) rejecting the first input gesture if the variance is not within the threshold.

In some exemplary embodiments, the collection of first input gestures includes at least one input gesture selected based on a current location of the user. In some exemplary embodiments, the collection of first input gestures includes at least one input gesture selected based on a trait of the user, such as gender, age, native-language, etc.

In some exemplary embodiments, capturing movements by a user interacting with the simulated environment comprises tracking a position of one or more sensors associated with at least one body part of the user. In some exemplary embodiments, at least one of the sensors is a handheld sensor.

In some exemplary embodiments, the collection of first input gestures is stored in a data store.

In some exemplary embodiments, the simulated environment is a virtual reality environment. In some exemplary embodiments, the simulated environment is an augmented reality environment.

Numerous other aspects, advantages, and/or features of the general inventive concepts will become more readily apparent from the following detailed description of exemplary embodiments and from the accompanying drawings being submitted herewith.

BRIEF DESCRIPTION OF THE DRAWINGS

The general inventive concepts, as well as embodiments and advantages thereof, are described below in greater detail, by way of example, with reference to the drawings in which:

FIG. 1A shows a "thumbs up" hand gesture. FIG. 1B shows a "come here" hand gesture. FIG. 1C shows a "horn fingers" hand gesture. FIG. 1D shows an "okay sign" hand gesture. FIG. 1E shows a "V sign" hand gesture.

DETAILED DESCRIPTION

Figure 1A:
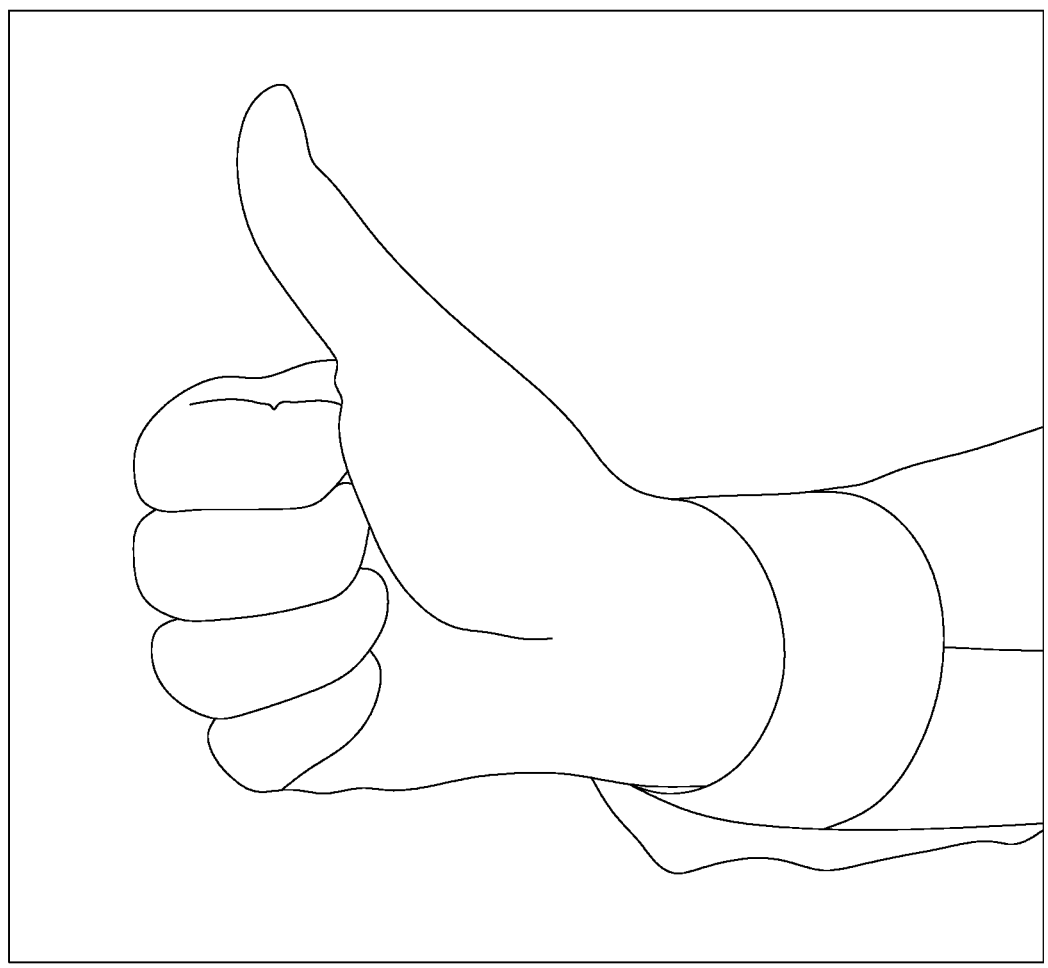
FIGS. 1A-1E illustrate various exemplary hand gestures.

While the general inventive concepts are susceptible of embodiment in many different forms, there are shown in the drawings, and will be described herein in detail, specific embodiments thereof with the understanding that the present disclosure is to be considered as an exemplification of the principles of the general inventive concepts. Accordingly, the general inventive concepts are not intended to be limited to the specific embodiments illustrated herein. For example, while various exemplary embodiments are shown and described herein in the context of a virtual reality environment, the general inventive concepts are applicable to other simulated environment technology (e.g., augmented reality).

While conventional VR systems require that users adapt to their specific input requirements/mannerisms, the general inventive concepts contemplate VR systems and methods that can adapt to the nuances of each user's own input gestures. To that end, the general inventive concepts relate to systems for and methods of managing input gestures within a simulated (e.g., virtual reality, augmented reality) environment.

As noted above, gestures can have different meanings to different users, for example, depending on the user's culture, region, country, etc. A few exemplary hand gestures are shown in FIGS. 1A-1E.

In FIG. 1A, a "thumbs up" hand gesture 100 is illustrated. In many countries, this hand gesture 100 reflects a sign of approval. In other parts of the world (e.g., Bangladesh), it is considered an insult and not likely to be widely accepted in those areas.

Figure 1B:
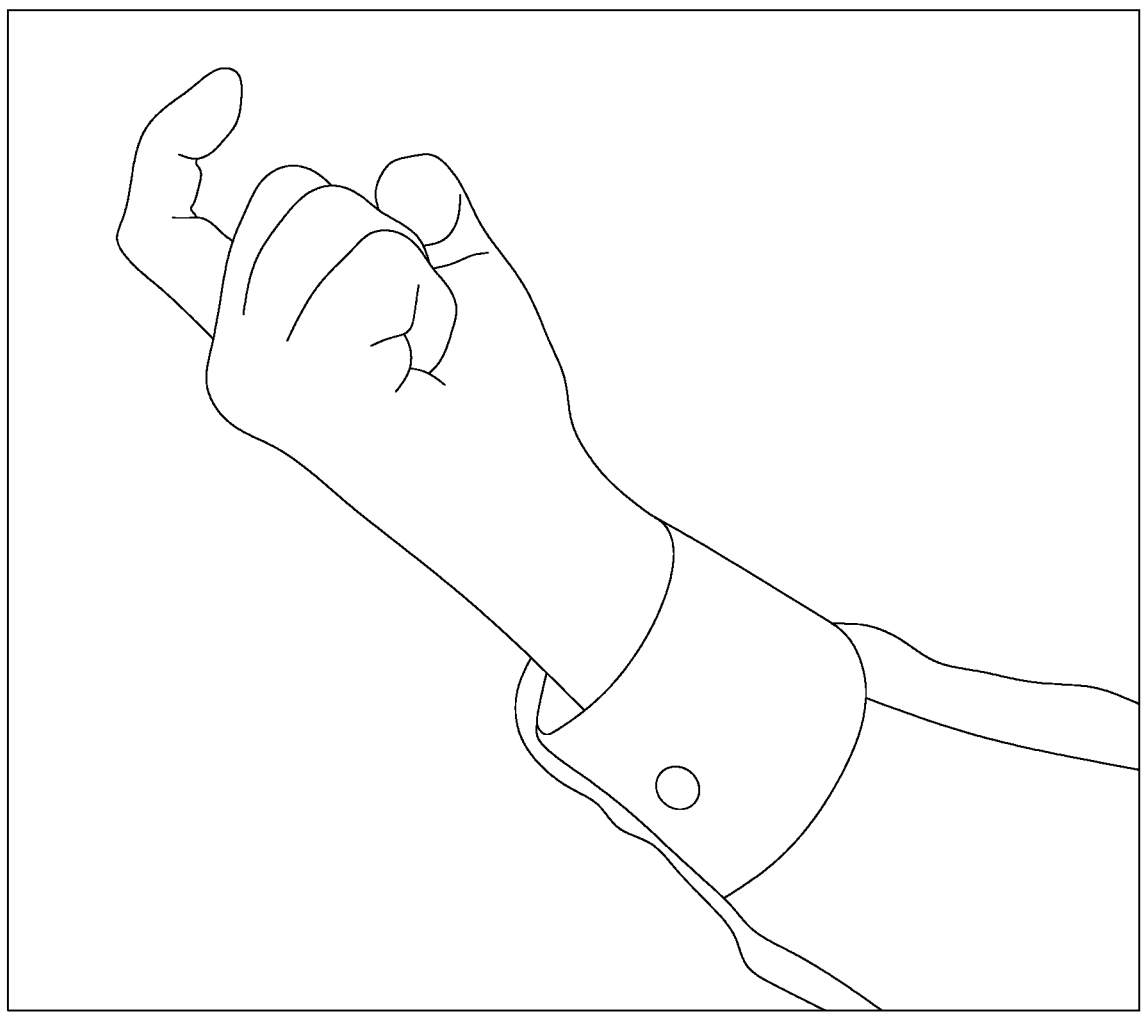

In FIG. 1B, a "come here" hand gesture 102 is illustrated. In North America, this hand gesture 102 has a well understood and accepted meaning of requesting that someone approach. Conversely, in many Asian countries, it is considered an insult when used with another person.

Figure 1C:
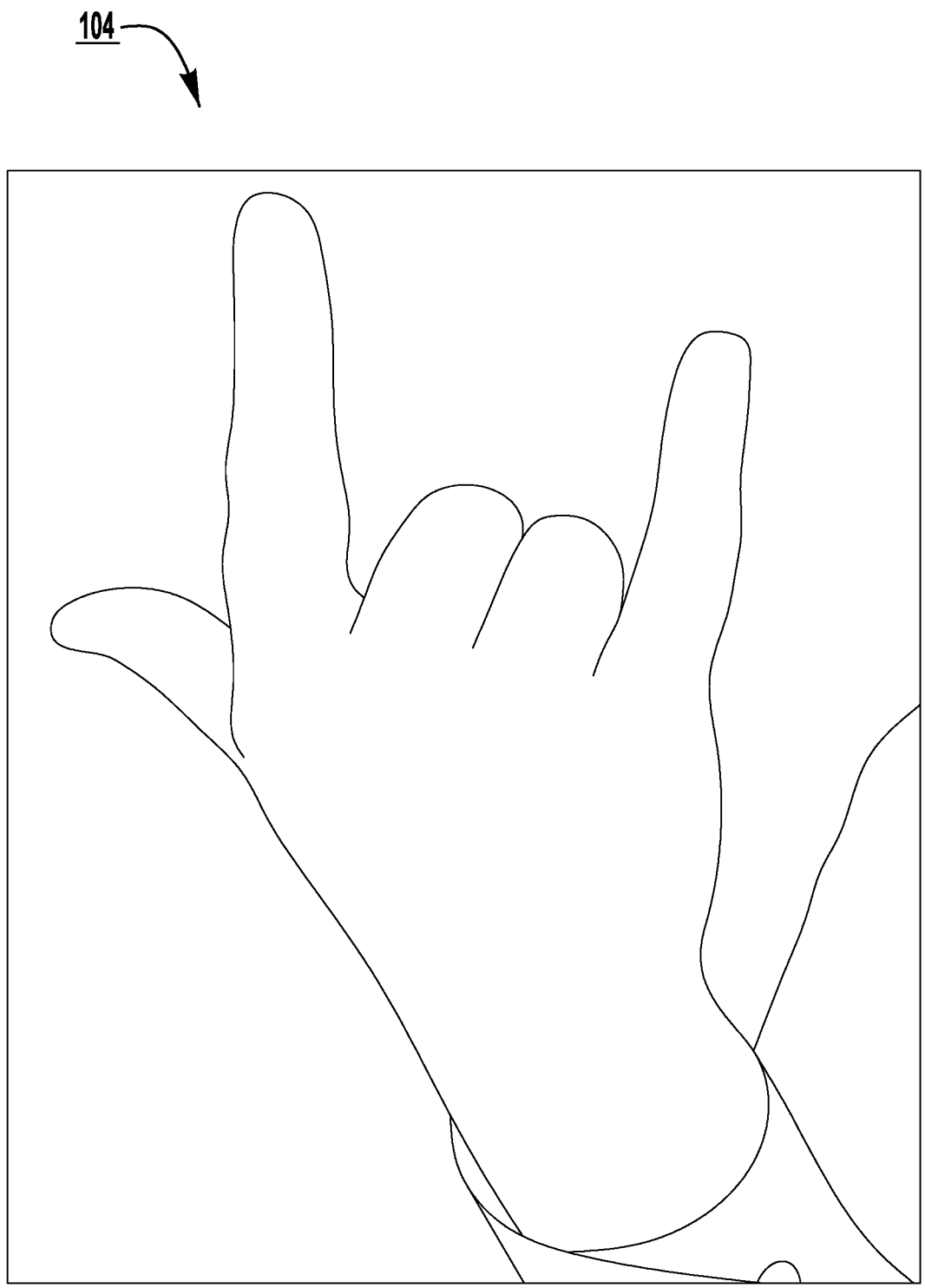

In FIG. 1C, a "horn fingers" hand gesture 104 is illustrated. In many countries, this hand gesture 104 is recognized as having a positive meaning, such as "Rock On!" or simply a sign of approval. In other parts of the world (e.g., Brazil, Spain, Italy), it has a negative meaning, i.e., to indicate that one's spouse is cheating on them.

Figure 1D:
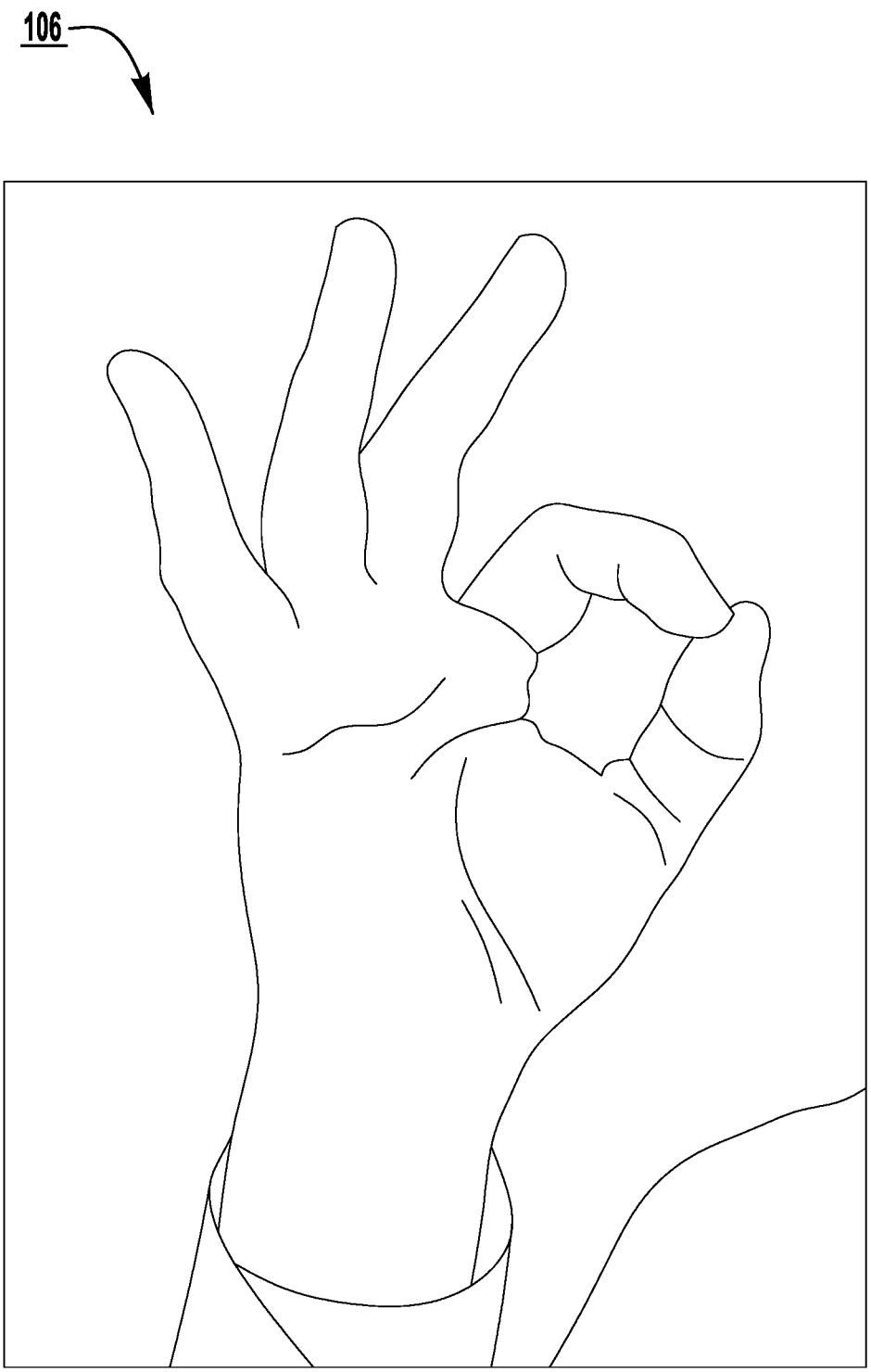

In FIG. 1D, an "okay" hand gesture 106 is illustrated. In many parts of the world, this hand gesture 106 is understood as a sign of acceptance, approval, or a general indication that everything in fine. In Brazil, however, it is considered a rude gesture.

Figure 1E:
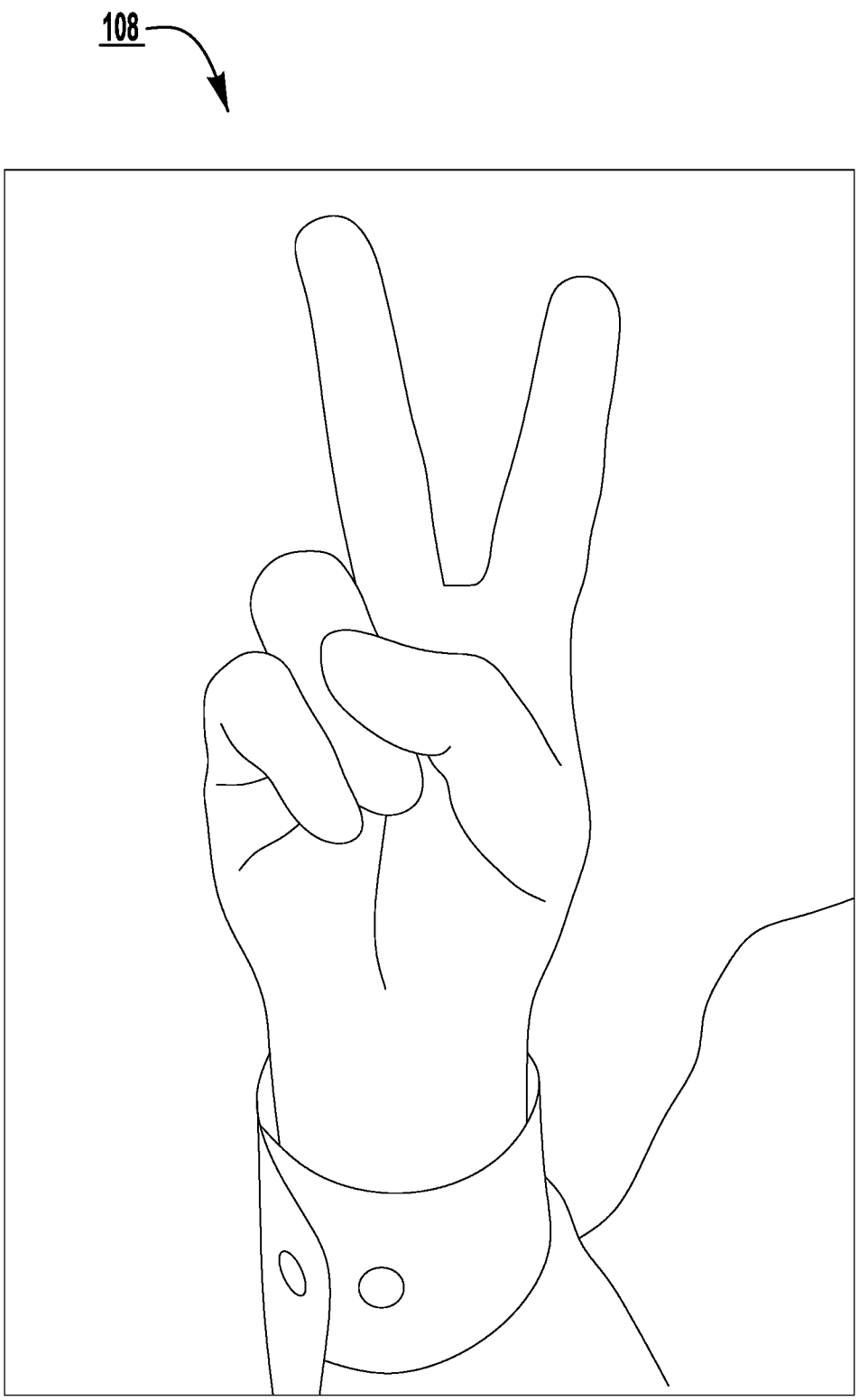

In FIG. 1E, a "V" hand gesture 108 is illustrated. In the U.S., this hand gesture 108 is associated with signaling victory, regardless of whether the gesture is made with the palm facing inward or outward. In other regions (e.g., Australia, South Africa, the United Kingdom), if this hand gesture 108 is made with the palm facing inward, it is considered an insult to the person in which the back of the hand is directed.

Accordingly, a VR system programmed to respond to a particular hand gesture might not go over well in a country where the hand gesture is considered rude or offensive. Furthermore, given the potentially high variance in the same hand gesture from user to user, as well as subtle variances in the same hand gesture from the same user at different times, VR systems may struggle to recognize the user's intended input gesture as valid input.

There are, of course, other applications for the general inventive concepts presented herein. As one example, the invention could allow users to map their own custom hand gestures as replacement gestures for those default gestures recognized by a VR system. As another example, the invention could assist disabled users that may not be able to readily make the particular hand gestures supported by a VR system.

Figure 2:
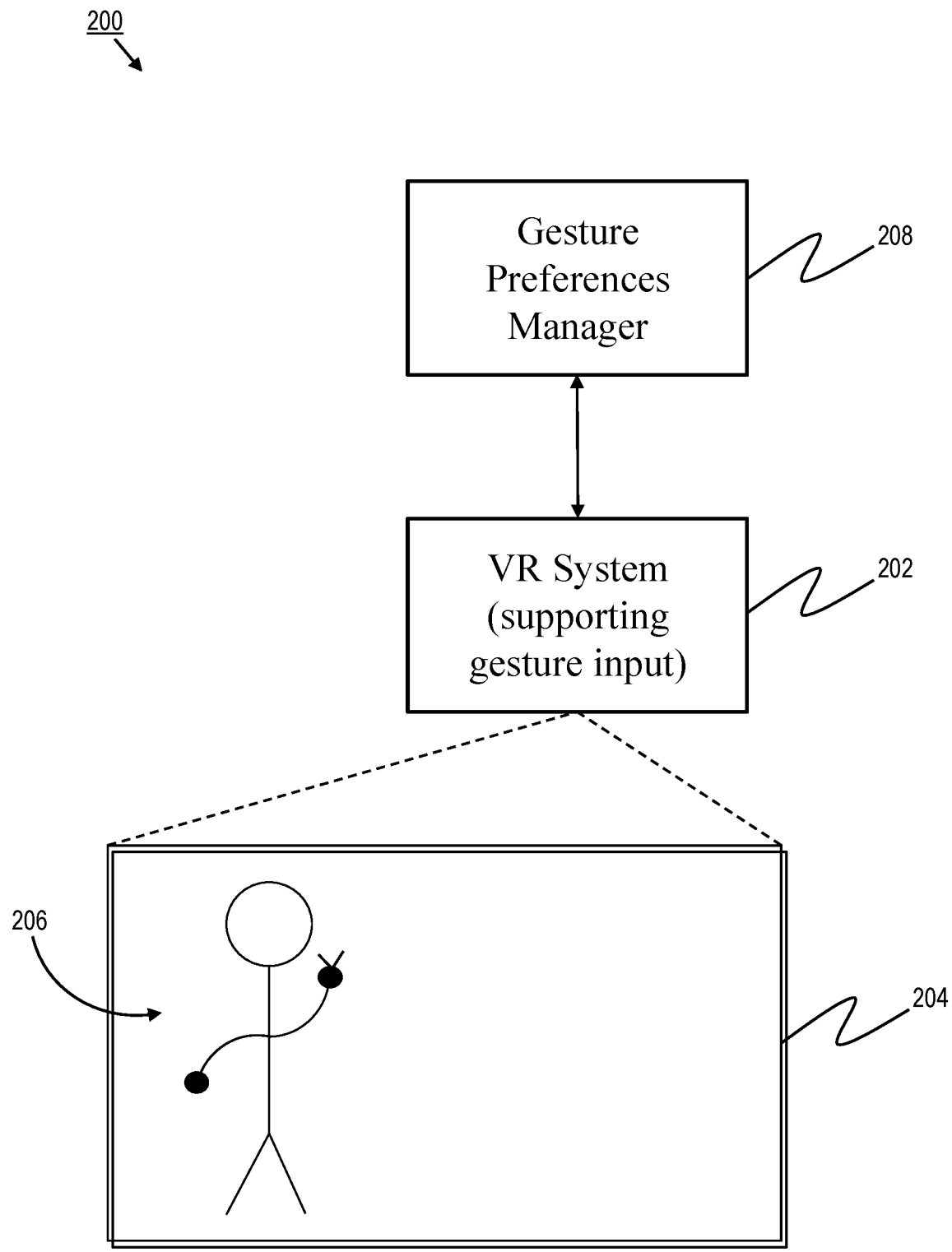
FIG. 2 is a diagram of a system for managing input gestures within a simulated environment, according to an exemplary embodiment.

As shown in FIG. 2, a system 200 for managing input gestures within a simulated (e.g., virtual reality) environment is illustrated. The system 200 includes a VR system 202 that generates a virtual environment 204 in which a user can interact, as known in the art. The VR system 202 can use known components, such as a headset that places screens in front of the user's eyes, headphones that place speakers over the user's ears, a computer and/or associated logic (e.g., processor, memory, storage) for generating the virtual environment and processing the user's interaction therewith, etc. Any components (now known or later developed) needed for or otherwise enhancing the VR experience can form part of VR system 202.

The system 200 also includes a gesture preferences manager (GPM) 208. The GPM 208 interfaces with the VR system 202 and can exchange information therewith. The GPM 208 can provide additional functionality to the VR system 202 with respect to extending and managing gesture inputs accepted by the VR system 202.

In some exemplary embodiments, the GPM 208 categorizes and stores multiple instances of default gesture preferences, wherein the different instances account for one or more of the intended culture, region, and country of the users of a VR system (e.g., the VR system 202). In this manner, a user could select the appropriate set of default gesture preferences to be used. Alternatively, the VR system 202 could automatically select the appropriate set of default gesture preferences based on information provided to the system by the user (e.g., the user's location) or based on information detected by the system (e.g., the installation country).

In some exemplary embodiments, the GPM 208 analyzes a user's gesture and determines if the gesture is within an acceptable threshold of variance tolerated by the VR system 202. If not, the GPM 208 can store the user's gesture as a gesture extension that going forward would be deemed an acceptable gesture input to the VR system 202 interfaced with the GPM 208. In this manner, the GPM 208 allows the VR system 202 to adapt to gesturing nuances of different users of the VR system 202. By reducing, if not eliminating, the frustration of users from having their input gestures rejected by the VR system 202, adoption and continued use of the VR system 202 is promoted.

The GPM 208 can be implemented using logic (e.g., software and/or hardware) that performs the aforementioned functions. In some exemplary embodiments, the GPM 208 is software that runs on the VR system 202. In some exemplary embodiments, the GPM 208 is software that runs external to the VR system 202. In some exemplary embodiments, the GPM 208 is stored on and runs from one or more servers so that it can be accessed by many different remote VR systems. Typically, the GPM 208 will include one or more data stores for storing the various gesture sets and user-specific extensions thereto.

Figure 3:
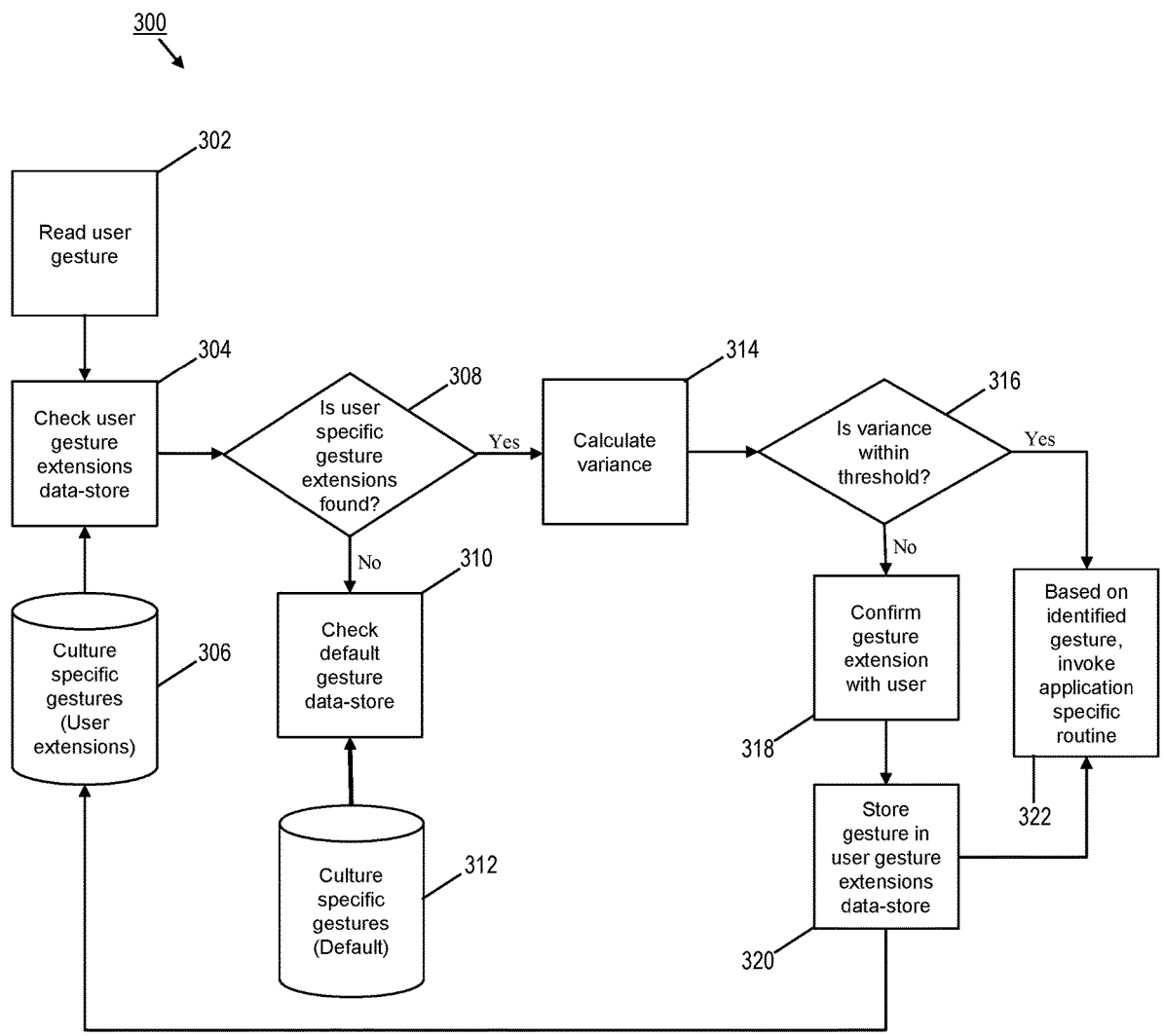
FIG. 3 is a flowchart illustrating a method of managing input gestures within a simulated environment, according to an exemplary embodiment.

As shown in FIG. 3, a method 300 of managing input gestures within a simulated (e.g., virtual reality) environment is illustrated.

In a first step 302, a gesture of the user is read by a sensor of the VR system. Then, in step 304, a data store 306 is checked to determine if there are any user-specific gesture extensions stored for the user. If it is determined (in step 308) that no such user-specific gesture extensions are stored for the user, the input gesture is checked (in step 310) against default gestures stored in a data store 312. In some exemplary embodiments, the data stores 306 and 312 may be the same data store. Conversely, if it is determined (in step 308) that user-specific gesture extensions are stored for the user, a variance between the input gesture and the corresponding user-specific extension is calculated in step 314. Any suitable algorithm can be used to calculate the variance. For example, Table 1 below shows various calculations for several different gesture elements.

TABLE 1

| # | Gesture Element | Variance Calculation |
|---|---|---|
| 1 | Head Gesture | $X_{min} = \text{MIN}(X_1, X_2 \ldots X_n) - \text{MEDIAN}(X_1, X_2 \ldots X_n)/2$ |
|   |   | $X_{max} = \text{MAX}(X_1, X_2 \ldots X_n) + \text{MEDIAN}(X_1, X_2 \ldots X_n)/2$ |
|   |   | $Y_{min} = \text{MIN}(Y_1, Y_2 \ldots Y_n) - \text{MEDIAN}(Y_1, Y_2 \ldots Y_n)/4$ |
|   |   | $Y_{max} = \text{MAX}(Y_1, Y_2 \ldots Y_n) + \text{MEDIAN}(Y_1, Y_2 \ldots Y_n)/4$ |
|   |   | $Z_{min} = \text{MIN}(Z_1, Z_2 \ldots Z_n) - \text{MEDIAN}(Z_1, Z_2 \ldots Z_n)/4$ |
|   |   | $Z_{max} = \text{MAX}(Z_1, Z_2 \ldots Z_n) + \text{MEDIAN}(Z_1, Z_2 \ldots Z_n)/4$ |
| 2 | Shoulder Gesture | $X_{min} = \text{MIN}(X_1, X_2 \ldots X_n) - \text{MEDIAN}(X_1, X_2 \ldots X_n)/8$ |
|   |   | $X_{max} = \text{MAX}(X_1, X_2 \ldots X_n) + \text{MEDIAN}(X_1, X_2 \ldots X_n)/8$ |
|   |   | $Y_{min} = \text{MIN}(Y_1, Y_2 \ldots Y_n) - \text{MEDIAN}(Y_1, Y_2 \ldots Y_n)/8$ |
|   |   | $Y_{max} = \text{MAX}(Y_1, Y_2 \ldots Y_n) + \text{MEDIAN}(Y_1, Y_2 \ldots Y_n)/8$ |
|   |   | $Z_{min} = \text{MIN}(Z_1, Z_2 \ldots Z_n) - \text{MEDIAN}(Z_1, Z_2 \ldots Z_n)/8$ |
|   |   | $Z_{max} = \text{MAX}(Z_1, Z_2 \ldots Z_n) + \text{MEDIAN}(Z_1, Z_2 \ldots Z_n)/8$ |
| 3 | Elbow Gesture | $X_{min} = \text{MIN}(X_1, X_2 \ldots X_n) - \text{MEDIAN}(X_1, X_2 \ldots X_n)/8$ |
|   |   | $X_{max} = \text{MAX}(X_1, X_2 \ldots X_n) + \text{MEDIAN}(X_1, X_2 \ldots X_n)/8$ |
|   |   | $Y_{min} = \text{MIN}(Y_1, Y_2 \ldots Y_n) - \text{MEDIAN}(Y_1, Y_2 \ldots Y_n)/8$ |
|   |   | $Y_{max} = \text{MAX}(Y_1, Y_2 \ldots Y_n) + \text{MEDIAN}(Y_1, Y_2 \ldots Y_n)/8$ |
|   |   | $Z_{min} = \text{MIN}(Z_1, Z_2 \ldots Z_n) - \text{MEDIAN}(Z_1, Z_2 \ldots Z_n)/8$ |
|   |   | $Z_{max} = \text{MAX}(Z_1, Z_2 \ldots Z_n) + \text{MEDIAN}(Z_1, Z_2 \ldots Z_n)/8$ |
| 4 | Wrist Gesture | $X_{min} = \text{MIN}(X_1, X_2 \ldots X_n) - \text{MEDIAN}(X_1, X_2 \ldots X_n)/8$ |
|   |   | $X_{max} = \text{MAX}(X_1, X_2 \ldots X_n) + \text{MEDIAN}(X_1, X_2 \ldots X_n)/8$ |
|   |   | $Y_{min} = \text{MIN}(Y_1, Y_2 \ldots Y_n) - \text{MEDIAN}(Y_1, Y_2 \ldots Y_n)/8$ |
|   |   | $Y_{max} = \text{MAX}(Y_1, Y_2 \ldots Y_n) + \text{MEDIAN}(Y_1, Y_2 \ldots Y_n)/8$ |
|   |   | $Z_{min} = \text{MIN}(Z_1, Z_2 \ldots Z_n) - \text{MEDIAN}(Z_1, Z_2 \ldots Z_n)/8$ |
|   |   | $Z_{max} = \text{MAX}(Z_1, Z_2 \ldots Z_n) + \text{MEDIAN}(Z_1, Z_2 \ldots Z_n)/8$ |

Based on the variance calculation, it is determined in step 316 if the calculated variance is within a predefined threshold. If it is determined (in step 316) that the calculated variance is not within the predefined threshold, the user is prompted to confirm that the input gesture should be treated as a user-specific extension, in step 318. Upon receiving such confirmation from the user, the input gesture is stored (in step 320) in the data store 306, and the input gesture is passed on to the VR system (in step 322) wherein the specific action can occur in response to the input gesture. Conversely, if it is determined (in step 316) that the calculated variance is within the predefined threshold, the input gesture is directly passed on to the VR system (in step 322) wherein the specific action can occur in response to the input gesture.

The hand gestures can be represented in any manner suitable for use with the systems (e.g., the system 200) and the methods (e.g., the method 300) disclosed or suggested herein.

As shown in Tables 2-3, a number of different gestures can be grouped by gesture type and the corresponding elements for that gesture type, along with relevant information for characterizing particular details of the gesture.

TABLE 2

| # | Gesture Type | Gesture Elements |
|---|---|---|
| 1 | Hand Gesture | Finger Gesture |
| | | Wrist Transition Cartesian Coordinates (X, Y, Z) |
| | | Forearm Transition Cartesian Coordinates (X, Y, Z) |
| | | Shoulder Transition Cartesian Coordinates (X, Y, Z) |
| 2 | Head Gesture | Head Transition Cartesian Coordinates (X, Y, Z) |

TABLE 3

| # | Gesture Element | Details |
|---|---|---|
| 1 | Right Hand | Represented by "0" in the most significant bit |
| 2 | Left Hand | Represented by "1" in the most significant bit |
| 3 | Small Finger | Represented by two bits. |
| | | 00 - Folded finger |
| | | 01 - Partially folded finger |
| | | 10 - Partially raised finger |
| | | 11 - Raised finger |
| 4 | Ring Finger | Represented by two bits. |
| | | 00 - Folded finger |
| | | 01 - Partially folded finger |
| | | 10 - Partially raised finger |
| | | 11 - Raised finger |
| 5 | Middle Finger | Represented by two bits. |
| | | 00 - Folded finger |
| | | 01 - Partially folded finger |
| | | 10 - Partially raised finger |
| | | 11 - Raised finger |
| 6 | Index Finger | Represented by two bits. |
| | | 00 - Folded finger |
| | | 01 - Partially folded finger |
| | | 10 - Partially raised finger |
| | | 11 - Raised finger |
| 7 | Thumb | Represented by two bits. |
| | | 00 - Folded finger |
| | | 01 - Partially folded finger |
| | | 10 - Partially raised finger |
| | | 11 - Raised finger |
| 8 | Wrist | An array of (X, Y, Z) Cartesian Coordinates. |
| 9 | Forearm | An array of (X, Y, Z) Cartesian Coordinates. |
| 10 | Shoulder | An array of (X, Y, Z) Cartesian Coordinates. |

The exemplary representations of various gestures are shown in Tables 4-5.

TABLE 4

| # | Hand Gesture Type | Details |
|---|---|---|
| 1 | Right hand with raised index finger. | Finger positions: $(0\ 00\ 00\ 11\ 11\ 00)_2 = 60$ |
| | | Angles between fingers: 0,0,0,30,0 |
| | | Data representation: |
| | | "hand_transitions": [ |
| | | { |
| | | "fingers": "60", |
| | | "A1": ["0"], |
| | | "A2": ["0"], |
| | | "A3": ["0"], |
| | | "A4": ["30"], |
| | | "A5": ["0"] |
| | | } |
| 2 | Left hand with raised index finger. | Finger positions: $(1\ 00\ 00\ 11\ 11\ 00)_2 = 1084$ |
| | | Angles between fingers: 0,30,0,0,0 |
| | | Data representation: |
| | | "hand_transitions": [ |
| | | { |
| | | "fingers": "1084", |
| | | "A1": ["0"], |
| | | "A2": ["30"], |
| | | "A3": ["0"], |
| | | "A4": ["0"], |
| | | "A5": ["0"] |
| | | } |

TABLE 5

| # | Shoulder/Elbow/Wrist | Details |
|---|---|---|
| 1 | Shoulder transitioning from (Y, Y, Z) to $(X^1, Y^1, Z^1)$ | An array of initial and transition Shoulder Cartesian co-ordinates. |
| | | Data representation: |
| | | "shoulder_transitions": [ |
| | | { |
| | | "x": "10", |
| | | "y": "10", |
| | | "z": "0" |
| | | }, |
| | | { |
| | | "x": "14", |
| | | "y": "14" |
| | | "z": "0" |
| | | } |
| | | ] |
| 2 | Elbow transitioning from (Y, Y, Z) to $(X^{11}, Y^{11}, Z^{11})$ | An array of initial and transition Elbow Cartesian co-ordinates. |
| | | Data representation: |
| | | "elbow_transitions": [ |
| | | { |
| | | "x": "20", |
| | | "y": "10", |
| | | "z": "20" |
| | | }, |
| | | { |
| | | "x": "24", |
| | | "y": "14" |
| | | "z": "24" |
| | | } |
| | | ] |

TABLE 5-continued

| # | Shoulder/Elbow/Wrist | Details |
|---|---|---|
| 3 | Wrist transitioning from (Y, Y, Z) to ($X^{111}$, $Y^{111}$, $Z^{111}$) | An array of initial and transition Wrist Cartesian co-ordinates.<br>Data representation:<br>"wrist_transitions": [<br>  {<br>    "x": "5",<br>    "y": "5",<br>    "z": "5"<br>  },<br>  {<br>    "x": "6",<br>    "y": "8",<br>    "z": "6"<br>  }<br>] |

The scope of the general inventive concepts presented herein are not intended to be limited to the particular exemplary embodiments shown and described herein. From the disclosure given, those skilled in the art will not only understand the general inventive concepts and their attendant advantages, but will also find apparent various changes and modifications to the methods and systems disclosed. For example, while various exemplary embodiments are shown and described herein in the context of a virtual reality environment, the general inventive concepts are applicable to other simulated environment technology (e.g., augmented reality). As another example, although various exemplary embodiments are shown and described herein in the context of hand gestures, the general inventive concepts are applicable to other types of gestures, such as head gestures. It is sought, therefore, to cover all such changes and modifications as fall within the spirit and scope of the general inventive concepts, as described and/or claimed herein, and any equivalents thereof.

It is claimed:

1. A system for managing input gestures in a simulated environment, the system comprising:
    a first processor for generating the simulated environment,
    means for capturing movements by a user interacting with the simulated environment,
    a memory for storing a user-selectable set of default gesture preferences, and
    a second processor for interpreting the movements by the user to identify a first input gesture,
    wherein the second processor determines whether the first input gesture corresponds to a second input gesture selected from a first plurality of predefined input gestures usable within the simulated environment, and
    wherein when the first input gesture has not previously been included in the user-selectable set of default gesture preferences, the second processor extends the user-selectable set of default gesture preferences so as to include the first input gesture therein, and
    wherein the first plurality of predefined input gestures usable within the simulated environment differs from a second plurality of predefined input gestures usable within the simulated environment, and
    wherein, for each of the first plurality of predefined input gestures, the second processor is configured to determine whether the first input gesture corresponds to the second input gesture by: (1) calculating a variance between the first input gesture and the respective one of the first plurality of input gestures and (2) determining whether the variance is within a predefined threshold associated with the first input gesture, wherein each of the variance between the first input gesture and each respective one of the first plurality of input gestures includes a multi-dimensional variance that is calculated based on at least three parameters that are mutually orthogonal, each of the at least three parameters corresponding to at least one from among a minimum displacement value with respect to an x-axis, a maximum displacement value with respect to the x-axis, a minimum displacement value with respect to a y-axis, a maximum displacement value with respect to the y-axis, a minimum displacement value with respect to a z-axis, and a maximum displacement value with respect to the z-axis.

2. The system of claim 1, wherein the first plurality of predefined input gestures is associated with a first geographic region, and
    wherein the second plurality of predefined input gestures is associated with a second geographic region.

3. The system of claim 2, wherein the first geographic region is a first country, and
    wherein the second geographic region is a second country.

4. The system of claim 3, wherein the second processor automatically applies the first plurality of predefined input gestures if the user is in the first country and the second plurality of predefined input gestures if the user is in the second country.

5. The system of claim 1, wherein at least one of the first plurality of predefined input gestures and the second plurality of predefined input gestures includes one or more input gestures defined by the user.

6. The system of claim 1, wherein the second input gesture represents an intended action within the simulated environment,
    wherein a third input gesture selected from the second plurality of predefined input gestures usable within the simulated environment represents the intended action, and
    wherein the second input gesture and the third input gesture are different.

7. The system of claim 6, wherein the second input gesture is associated with movement of a body part of the user, and
    wherein the third input gesture is not associated with movement of the body part of the user.

8. The system of claim 7, wherein the body part is selected from the group consisting of a left hand, a right hand, a left arm, a right arm, a left foot, a right foot, a left leg, a right leg, a left eye, a right eye, and a head of the user.

9. The system of claim 1, wherein the means for capturing movements by the user comprises at least one camera.

10. The system of claim 1, wherein the simulated environment is a virtual reality environment.

11. The system of claim 1, wherein the simulated environment is an augmented reality environment.

12. A system for managing input gestures in a simulated environment, the system comprising:
   a first processor for generating the simulated environment,
   means for capturing movements by a user interacting with the simulated environment,
   a memory for storing a user-selectable set of default gesture preferences, and
   a second processor for interpreting the movements by the user to identify a first input gesture representing an intended action within the simulated environment,
   wherein the second processor identifies a second input gesture representing the intended action selected from a plurality of predefined input gestures usable within the simulated environment, and
   wherein when the first input gesture has not previously been included in the user-selectable set of default gesture preferences, the second processor extends the user-selectable set of default gesture preferences so as to include the first input gesture therein, and
   wherein when the second processor determines that the first input gesture is outside a threshold of tolerance for the second input gesture, the second processor causes the first input gesture to be added to the plurality of predefined input gestures as an alternative input gesture for the intended action, and
   wherein the second processor is configured to determine whether the first input gesture is outside the threshold of tolerance for the second input gesture by calculating a multi-dimensional variance between the first input gesture and the second input gesture based on at least three parameters that are mutually orthogonal, each of the at least three parameters corresponding to at least one from among a minimum displacement value with respect to an x-axis, a maximum displacement value with respect to the x-axis, a minimum displacement value with respect to a y-axis, a maximum displacement value with respect to the y-axis, a minimum displacement value with respect to a z-axis, and a maximum displacement value with respect to the z-axis.

13. The system of claim 12, wherein the plurality of predefined input gestures includes a first alternative input gesture associated with a first user for the intended action and a second alternative input gesture associated with a second user for the intended action.

14. The system of claim 13, wherein the second processor automatically applies the first alternative input gesture if the first user is using the system and the second alternative input gesture if the second user is using the system.

15. A method of managing input gestures in a simulated environment, the method comprising:
   generating the simulated environment;
   providing a collection of first input gestures usable within the simulated environment;
   capturing movements by a user interacting with the simulated environment;
   processing the movements to identify a second input gesture;
   determining whether the collection of first input gestures includes any third input gestures specific to the user;
   when the collection of first input gestures includes at least one third input gesture, for each third input gesture: (1) calculating a variance between the second input gesture and the third input gesture, (2) determining whether the variance is within a predefined threshold associated with the third input gesture; (3) using the third input gesture when the variance is within the threshold, and (4) rejecting the third input gesture when the variance is not within the threshold, wherein each of the variance between the second input gesture and each third input gesture includes a multi-dimensional variance that is calculated based on at least three parameters that are mutually orthogonal, each of the at least three parameters corresponding to at least one from among a minimum displacement value with respect to an x-axis, a maximum displacement value with respect to the x-axis, a minimum displacement value with respect to a y-axis, a maximum displacement value with respect to the y-axis, a minimum displacement value with respect to a z-axis, and a maximum displacement value with respect to the z-axis; and
   when the collection of first input gestures does not include at least one third input gesture, for each first input gesture in the collection: (1) calculating a variance between the second input gesture and the first input gesture, (2) determining whether the variance is within a predefined threshold associated with the first input gesture; (3) using the first input gesture when the variance is within the threshold, and (4) rejecting the first input gesture when the variance is not within the threshold, wherein each of the variance between the second input gesture and each first input gesture includes a multi-dimensional variance that is calculated based on at least three parameters that are mutually orthogonal, each of the at least three parameters corresponding to at least one from among a minimum displacement value with respect to an x-axis, a maximum displacement value with respect to the x-axis, a minimum displacement value with respect to a y-axis, a maximum displacement value with respect to the y-axis, a minimum displacement value with respect to a z-axis, and a maximum displacement value with respect to the z-axis.

16. The method of claim 15, wherein the collection of first input gestures includes at least one input gesture selected based on a current location of the user.

17. The method of claim 15, wherein capturing movements by a user interacting with the simulated environment comprises tracking a position of one or more sensors associated with at least one body part of the user.

18. The method of claim 17, wherein at least one of the sensors is a handheld sensor.

19. A method of managing input gestures in a simulated environment, the method comprising:
   generating the simulated environment;
   providing a collection of first input gestures usable within the simulated environment;
   capturing movements by a user interacting with the simulated environment;
   processing the movements to identify a second input gesture representing an intended action within the simulated environment, determining whether the collection of first input gestures includes a third input gesture corresponding to the intended action specific to the user;

when the collection of first input gestures includes the third input gesture: (1) calculating a variance between the second input gesture and the third input gesture, (2) determining whether the variance is within a predefined threshold associated with the third input gesture; (3) using the third input gesture when the variance is within the threshold, and (4) allowing the user to accept the second input gesture as a new third input gesture for the intended action when the variance is not within the threshold, wherein the variance between the second input gesture and the third input gesture includes a multi-dimensional variance that is calculated based on at least three parameters that are mutually orthogonal, each of the at least three parameters corresponding to at least one from among a minimum displacement value with respect to an x-axis, a maximum displacement value with respect to the x-axis, a minimum displacement value with respect to a y-axis, a maximum displacement value with respect to the y-axis, a minimum displacement value with respect to a z-axis, and a maximum displacement value with respect to the z-axis; and when the collection of first input gestures does not include the third input gesture, for the first input gesture corresponding to the intended action in the collection: (1) calculating a variance between the second input gesture and the first input gesture, (2) determining whether the variance is within a predefined threshold associated with the first input gesture; (3) using the first input gesture when the variance is within the threshold, and (4) rejecting the first input gesture when the variance is not within the threshold, wherein the variance between the second input gesture and the first input gesture includes a multi-dimensional variance that is calculated based on at least three parameters that are mutually orthogonal, each of the at least three parameters corresponding to at least one from among a minimum displacement value with respect to an x-axis, a maximum displacement value with respect to the x-axis, a minimum displacement value with respect to a y-axis, a maximum displacement value with respect to the y-axis, a minimum displacement value with respect to a z-axis, and a maximum displacement value with respect to the z-axis.

20. The method of claim 19, wherein the collection of first input gestures includes at least one input gesture selected based on a current location of the user.

* * * * *